United States Patent [19]

Timmons

[11] 3,836,030
[45] Sept. 17, 1974

[54] CAMPER LOADING AND UNLOADING DEVICE

[76] Inventor: Albert S. Timmons, 5477 LaFayette, Newark, Calif. 94560

[22] Filed: Nov. 13, 1972

[21] Appl. No.: 305,880

[52] U.S. Cl. .................................. 214/515, 254/45
[51] Int. Cl. ............................................. B60p 1/64
[58] Field of Search ............ 214/515, 38 D; 254/45; 248/351, 352, 354

[56] References Cited
UNITED STATES PATENTS

| | | | |
|---|---|---|---|
| 1,048,722 | 12/1912 | Morgan | 254/45 |
| 2,983,394 | 3/1961 | McKee | 214/515 X |
| 3,148,795 | 9/1964 | Leach | 214/515 |
| 3,251,494 | 5/1966 | Pulliam | 214/515 X |
| 3,360,141 | 12/1967 | Martin | 254/45 X |

*Primary Examiner*—Albert J. Makay
*Attorney, Agent, or Firm*—A. J. Castorina

[57] ABSTRACT

The invention relates to a support structure adapted to be secured to a camper to facilitate the loading and unloading of the same onto and off of a truck bed.

6 Claims, 3 Drawing Figures 3,836,030

CAMPER LOADING AND UNLOADING DEVICE

BACKGROUND OF THE INVENTION

The prior art is aware of the problems of loading and unloading a camper onto a truck body and generally solves the problem by mounting collapsible type support legs onto the base of the camper whereby the same may be lowered into engagement with the ground to support the camper thereon in an elevated position above the truck bed. Thereafter, the truck may be driven away. To load the camper onto the bed, the above procedure is reversed and once the camper is in place the legs are collapsed and stored adjacent to the camper base. This structure is shown in U.S. Pat. No. 3,148,795.

BRIEF DESCRIPTION OF THE INVENTION

The present invention deals generally with the structural combination as described above and typified in said patent and is an improvement thereon.

In the present invention, leg units are pivotally disposed on each of the corners of the camer and are capable of moving from a folded or a travelling position wherein they are disposed parallel to the base of the camper to a position wherein they ar vertically disposed with respect thereto for supporting the same when the camper is removed from the vehicle. Each unit is comprised of two legs angularly spaced from one another and are adjustable to increase the versatility of the same and its adaptability to campers and truck beds of various heights. When the legs are moved to their vertical or support position, generally U-shaped channel members are secured to the bottom of each leg and the channels on each side of the camper are connected to add rigidity to the same. When the legs are collapsed for transportation purposes the channel members serve an additional function by maintaining the legs in a compact position adjacent the base of the camper.

It is therefore an object of the invention to provide new and improved legs which can be secured to a camper base to facilitate the loading and unloading of the same with respect to a truck support bed.

Another object of the invention is to provide legs which are adjustable to facilitate their mounting on campers of various designs and heights.

Another object is to provide ground engaging base members which are connected to each of the legs and to the companion legs on the same sides of the campers to add stability to the same.

Another object is to provide ground engaging base members which serve to constrain the legs when the same are in a collapsed, transportable condition.

Another object is to provide camper support legs which are sturdy, economical, easy to manufacture and simple to install.

These and other objects will become readily apparent upon inspection of the drawing and reading of the specification.

DESCRIPTION OF THE PREFERRED EMBODIMENT

Figure 1:
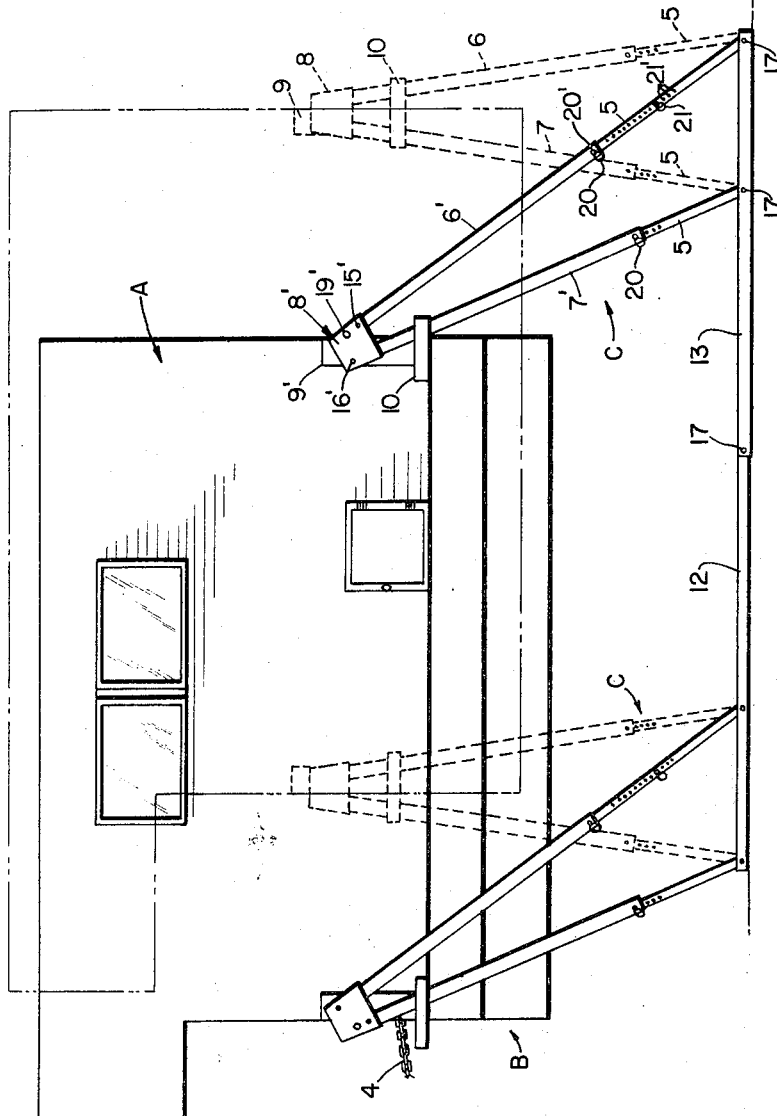
FIG. 1 is a side elevation of the invention mounted on a typical camper.

With reference to FIG. 1, a camper A is seen disposed on a truck bed B in known fashion. Leg units C are provided at each corner of the camper and as the same are of the same structure only one will be described. These units are comprised of upper tubular sections 6, 7 having telescoping lower sections 5, 5 slidably disposed therein. The upper sections are connected at their upper ends by nut and bolt means or the like 15, 16 to a bracket 8. Bracket 8 which serves to dispose the legs C in a V-shape relationship, is pivotally connected to a corner plate 9 as at 19 to facilitate the movement of the legs from an erected to a collapsed position as will become apparent hereinafter.

Openings 20, 20' are provided in each of the lower portions of the sections 6 and 7 respectively, and are adapted to be aligned with one of a plurality of openings 21', in the sections 5, whereby the overall heights of the leg units C can be regulated. Pins 20 inserted through the aligned openings 20, 21' maintain the leg sections in the desired adjusted position. Additionally pins 21 are used in conjunction with the rearmost leg 6 each unit C to limit the movement of section 6 with respect to section 5 for reasons that will become apparent hereinafter.

Figure 3:
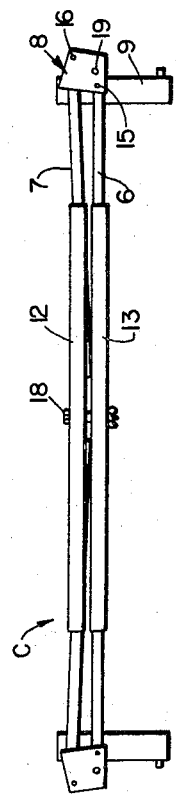
FIG. 3 is a side elevation of the jack assembly in the folded or travel position, shown without the camper.

FIG. 3 discloses a pair of leg units C on one side of the camper, in their collapsed or travel position wherein the brackets 8 are pivoted about pivot 19 to a substantially horizontal position above the truck body, not shown. The two leg units C,C are maintained thereat by U-shaped channel members 12, 13 disposed over and under the legs 6, 7 respectively, of the collapsed leg units C,C. Bolt and nut means 18 locks the members 12 and 13 together and thereby the leg units C,C to one another. Referring back to FIG. 1, it is seen that these channel members 12, 13 are removably connected to the bottom most sections 5, 5 of each of the leg units C,C respectively and to each other as at 17 and thus serve to steady and provide more ground engaging surface for the legs 6, 7, when the same are to be used to support the camper when the same is removed from the truck bed. It is therefore apparent that these channel members 12, 13 serve a dual function in the overall operational use of the support legs of the invention.

Figure 2:
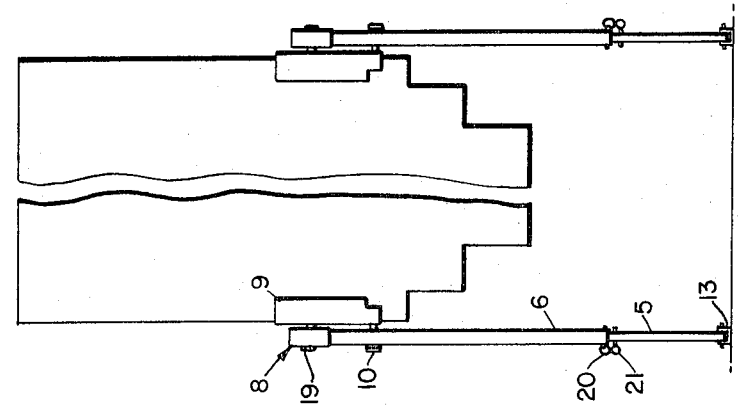
FIG. 2 is near elevation of the camper resting on the jack assembly.

As an additional safety feature it will be seen from FIG. 2 that the corner brackets 9 are each provided with retainers 10 formed of right angled members which limit the forward movement of the leg units C,C and maintain them in a vertical position.

When it is desired to remove the camper from the truck, each of the leg units are pivoted to a position shown in solid lines with the forward leg 7 of the unit being adjusted with respect to its section 5 by the pins 20 to a height which will insure that the camper will clear the truck bed when the legs are moved to a vertical support position. After the forward legs 7 have been set, the pin 21 of the leg 6 is then placed in the spaced opening 21 corresponding to the next adjacent lower opening than the opening in which the pin 20 was set in the forward leg 7. The truck is then moved rearwardly, causing the brackets of the leg unit 8 to pivot about pin 19 which in turn causes the rearmost leg 6 of each unit to telescope and collapse on its respective section 5 until the lower extremity of the section 6 engages the pin 21 thereby limiting the downward movement of the same. At this point, the rearward movement of the truck has caused the camper and the leg units to be moved to the broken line position of FIG. 1. The camper is thus elevated away from the truck bed. When the legs are in the vertical broken line position, the pin 20 of the rear leg 6 is then inserted into the opening immediately above the opening in which the pin 21 is placed, to lock the legs 6 of each unit C in place. The legs 6 and 7 of each unit are then of the same height. The truck is thereafter driven forwardly away from the camper.

To load the camper onto the truck body the reverse operation of that described above is followed. The truck bed is backed beneath the camper and the brakes are engaged whereafter safety chains 4 on the camper are pulled to cause the same to move forward as the leg units C,C move about the pivot 19 thereby easing the camper onto the truck bed.

The leg units C,C are then collapsed and locked in place along side the camper body in the travel position as shown in FIG. 3.

I claim:

1. A plurality of removable leg units adapted to be mounted onto a camper positioned on a truck bed for supporting the camper when it is removed from the bed, each of said leg units comprising an upper support, said upper support being a bracket pivotally disposed on a second support secured to the camper, a pair of legs connected to the bracket and being angularly disposed with respect to one another, means removably securing said legs to said support, each of said legs comprised of a main section and a telescoping section, alignment means on each of said sections adjustably positioning one section with respect to the other for adjusting the height thereof, said alignment means comprising a plurality of spaced openings disposed in one of said leg sections and at least one opening in the other section whereby one of said spaced openings can be aligned with the at least one opening for adjusting the length of said sections and a pin extending through said aligned openings, and a second pin positionable in another of said spaced openings on at least one of said sections for limiting the telescoping relationship of said sections when the legs are pivoted to an upright position.

2. The invention of claim 1 wherein the other support is provided with retaining means limiting the pivotal movement of said legs.

3. The invention of claim 1 wherein U-shaped channel members are positioned on the ground engaging portion of one of said sections thereby adding stability to the same, and means securing the channel members of the leg units on each side of the camper to one another.

4. The invention of claim 3 wherein the channel members engage and hold opposite sides of the leg units when the same are pivotally moved adjacent the camper body, and means locking the channel members to one another.

5. The invention of claim 1 wherein U-shaped channel members are positioned on the ground engaging portion of one of said sections thereby adding stability to the same, and means securing the channel members of the leg units on each side of the camper to one another.

6. The invention of claim 5 wherein the channel members engage and hold opposite sides of the leg units when the same are pivotally moved adjacent the camper body, and means locking the channel members to one another.

* * * * *